United States Patent [19]

Shirakabe et al.

[11] Patent Number: 4,667,089
[45] Date of Patent: May 19, 1987

[54] BAR CODE DISCRIMINATING APPARATUS FOR BAR CODE READING

[75] Inventors: Kazuhisa Shirakabe; Kazuo Ishii; Masatoshi Iriono, all of Tokyo, Japan

[73] Assignee: NEC Corporation, Japan

[21] Appl. No.: 626,678

[22] Filed: Jul. 2, 1984

[30] Foreign Application Priority Data

Jul. 1, 1983 [JP] Japan .................. 58-120019

[51] Int. Cl.$^4$ .............................................. G06K 7/10
[52] U.S. Cl. ...................... 235/462; 235/463
[58] Field of Search ................ 235/463, 462

[56] References Cited

U.S. PATENT DOCUMENTS

| | | | |
|---|---|---|---|
| 4,108,368 | 8/1978 | Dobras | 235/463 |
| 4,125,765 | 11/1978 | Cowardin | 235/463 |
| 4,146,046 | 3/1979 | Dobras | 235/463 |
| 4,158,435 | 6/1979 | Nakanishi | 235/463 |
| 4,160,156 | 7/1979 | Sherer | 235/463 |
| 4,178,693 | 11/1979 | Nakanishi | 235/463 |

Primary Examiner—Harold I. Pitts
Attorney, Agent, or Firm—Laff, Whitesel, Conte & Saret

[57] ABSTRACT

An apparatus for reading a bar code generally, and a Universal Product Code specifically, eliminates noise from spots on a blank area which is peripheral to the bar code. Each of the bar code characters has the same uniform width. The entire surface containing a bar code is scanned to read each of the code characters. The signal delivered from the scanning means successively indicates the widths of a white bar and a black bar adjacent thereto and the wdiths of a black bar and a white bar adjacent thereto, in order to alternately deliver width data corresponding to the adjacent white and black bars and to the adjacent black and white bars. These width signals are added and compared to the uniform width in order to deliver the output signal responsive to a sequential analysis of the width signals.

7 Claims, 3 Drawing Figures

FIG. 3

| SHIFT ORDER | SHIFT REGISTERS FOR CHARACTER DETECTION | | | | | | | SHIFT REGISTERS FOR BAR CODE DISCRIMINATION | | | | | | | | |
|---|---|---|---|---|---|---|---|---|---|---|---|---|---|---|---|---|
| | 4 | 5 | 6 | 7 | 8 | 9 | 10 | 14 | 15 | 16 | 17 | 18 | 19 | 20 | 21 | 22 |
| 1 | $b_1+w_1$ | | | | | | | 0 | 0 | 0 | 0 | 0 | 0 | 0 | 0 | 0 |
| 2 | $w_2+b_1$ | $b_1+w_1$ | | | | | | 0 | 0 | 0 | 0 | 0 | 0 | 0 | 0 | 0 |
| 3 | $b_2+w_2$ | $w_2+b_1$ | $b_1+w_1$ | | | | | 0 | 0 | 0 | 0 | 0 | 0 | 0 | 0 | 0 |
| 4 | $w_3+b_2$ | $b_2+w_2$ | $w_2+b_1$ | $b_1+w_1$ | | | | 0 | 0 | 0 | 0 | 0 | 0 | 0 | 0 | 0 |
| 5 | $b_3+w_3$ | $w_3+b_2$ | $b_2+w_2$ | $w_2+b_1$ | $b_1+w_1$ | | | 0 | 0 | 0 | 0 | 0 | 0 | 0 | 0 | 0 |
| 6 | $w_4+b_3$ | $b_3+w_3$ | $w_3+b_2$ | $b_2+w_2$ | $w_2+b_1$ | $b_1+w_1$ | | 0 | 0 | 0 | 0 | 0 | 0 | 0 | 0 | 0 |
| 7 | $b_4+w_4$ | $w_4+b_3$ | $b_3+w_3$ | $w_3+b_2$ | $b_2+w_2$ | $w_2+b_1$ | $b_1+w_1$ | 0 | 0 | 0 | 0 | 0 | 0 | 0 | 0 | 0 |
| 8 | $w_5+b_4$ | $b_4+w_4$ | $w_4+b_3$ | $b_3+w_3$ | $w_3+b_2$ | $b_2+w_2$ | $w_2+b_1$ | 0 | 0 | 0 | 0 | 0 | 0 | 0 | 0 | 0 |
| 9 | $b_5+w_5$ | $w_5+b_4$ | $b_4+w_4$ | $w_4+b_3$ | $b_3+w_3$ | $w_3+b_2$ | $b_2+w_2$ | 0 | 0 | 0 | 0 | 0 | 0 | 0 | 0 | 0 |
| 10 | $w_6+b_5$ | $b_5+w_5$ | $w_5+b_4$ | $b_4+w_4$ | $w_4+b_3$ | $b_3+w_3$ | $w_3+b_2$ | 1 | 0 | 0 | 0 | 0 | 0 | 0 | 0 | 0 |
| 11 | $b_6+w_6$ | $w_6+b_5$ | $b_5+w_5$ | $w_5+b_4$ | $b_4+w_4$ | $w_4+b_3$ | $b_3+w_3$ | 0 | 1 | 0 | 0 | 0 | 0 | 0 | 0 | 0 |
| 12 | $w_7+b_6$ | $b_6+w_6$ | $w_6+b_5$ | $b_5+w_5$ | $w_5+b_4$ | $b_4+w_4$ | $w_4+b_3$ | 1 | 0 | 1 | 0 | 0 | 0 | 0 | 0 | 0 |
| 13 | $b_7+w_7$ | $w_7+b_6$ | $b_6+w_6$ | $w_6+b_5$ | $b_5+w_5$ | $w_5+b_4$ | $b_4+w_4$ | 0 | 0 | 0 | 1 | 0 | 0 | 0 | 0 | 0 |
| 14 | $w_8+b_7$ | $b_7+w_7$ | $w_7+b_6$ | $b_6+w_6$ | $w_6+b_5$ | $b_5+w_5$ | $w_5+b_4$ | 1 | 1 | 0 | 0 | 1 | 0 | 0 | 0 | 0 |
| 15 | $b_8+w_8$ | $w_8+b_7$ | $b_7+w_7$ | $w_7+b_6$ | $b_6+w_6$ | $w_6+b_5$ | $b_5+w_5$ | 0 | 0 | 1 | 0 | 0 | 1 | 0 | 0 | 0 |
| 16 | $w_9+b_8$ | $b_8+w_8$ | $w_8+b_7$ | $b_7+w_7$ | $w_7+b_6$ | $b_6+w_6$ | $w_6+b_5$ | 0 | 1 | 0 | 1 | 0 | 0 | 1 | 0 | 0 |
| 17 | $b_9+w_9$ | $w_9+b_8$ | $b_8+w_8$ | $w_8+b_7$ | $b_7+w_7$ | $w_7+b_6$ | $b_6+w_6$ | 1 | 0 | 1 | 0 | 1 | 0 | 0 | 1 | 0 |
| 18 | $w_{10}+b_9$ | $b_9+w_9$ | $w_9+b_8$ | $b_8+w_8$ | $w_8+b_7$ | $b_7+w_7$ | $w_7+b_6$ | 0 | 0 | 0 | 1 | 0 | 1 | 0 | 0 | 1 |
| 19 | $b_{10}+w_{10}$ | $w_{10}+b_9$ | $b_9+w_9$ | $w_9+b_8$ | $b_8+w_8$ | $w_8+b_7$ | $b_7+w_7$ | ---- | ---- | ---- | ---- | ---- | ---- | ---- | ---- | ---- |

BAR CODE DISCRIMINATING APPARATUS FOR BAR CODE READING

BACKGROUND OF THE INVENTION

The present invention relates to a bar code reader, and more particularly, to a bar code discriminating apparatus for reading bar codes.

In a conventional bar code reader, it is difficult to extract only a signal corresponding to the bar code (a bar code signal) from a scanned signal which a scanner delivers responsive to scanning a surface containing a bar code label and the area surrounding the bar code label. For code extraction, it is necessary to read only the bar code signal, if the reading time is to be decreased. It is desirable to reduce reading errors and to simplify a reading circuit configuration. It is also desirable to discriminate between the bar code signal and a noise signal corresponding to the surrounding area. In order to discriminate the bar code signal, the invention counts the number of black bars and white bars, which build up the bar code. When the number of the black bars and white bars reaches a predetermined value, the series of the black bars and white bars is regarded as being a complete bar code to be read.

However, in practice, the prior art bar code discriminating technique frequently detects a bar code erroneously because the noise signal delivered from the area surrounding the bar code frequently contains random pulses which satisfy the discriminating condition. In this case, a bar code reader wastefully performs a reading operation and gives an incorrect output, which causes an increase in an error reading rate.

SUMMARY OF THE INVENTION

It is, therefore, an object of the present invention to provide a discriminating apparatus for reading bar codes, which is capable of accurately discriminating between a car code signal and a noise signal.

It is another object of the present invention to provide a discriminating apparatus for reading bar codes, which enables a bar code reader to be assembled from simpler circuit configurations and to use a low speed calculation processor.

According to the present invention, a discriminating apparatus for reading bar codes comprises a scanner for scanning a surface containing a bar code, which includes a plurality of characters. A character detection circuit compares the widths of adjacent bars for detecting the existence of characters of the bar code. A bar code discrimination circuit checks the sequence of a plurality of the characters detected by the character detection circuit.

BRIEF DESCRIPTION OF THE DRAWINGS

FIG. 3 indicates a data shifting table for explaining the operation of the embodiment shown in FIG. 2.

Figure 1:
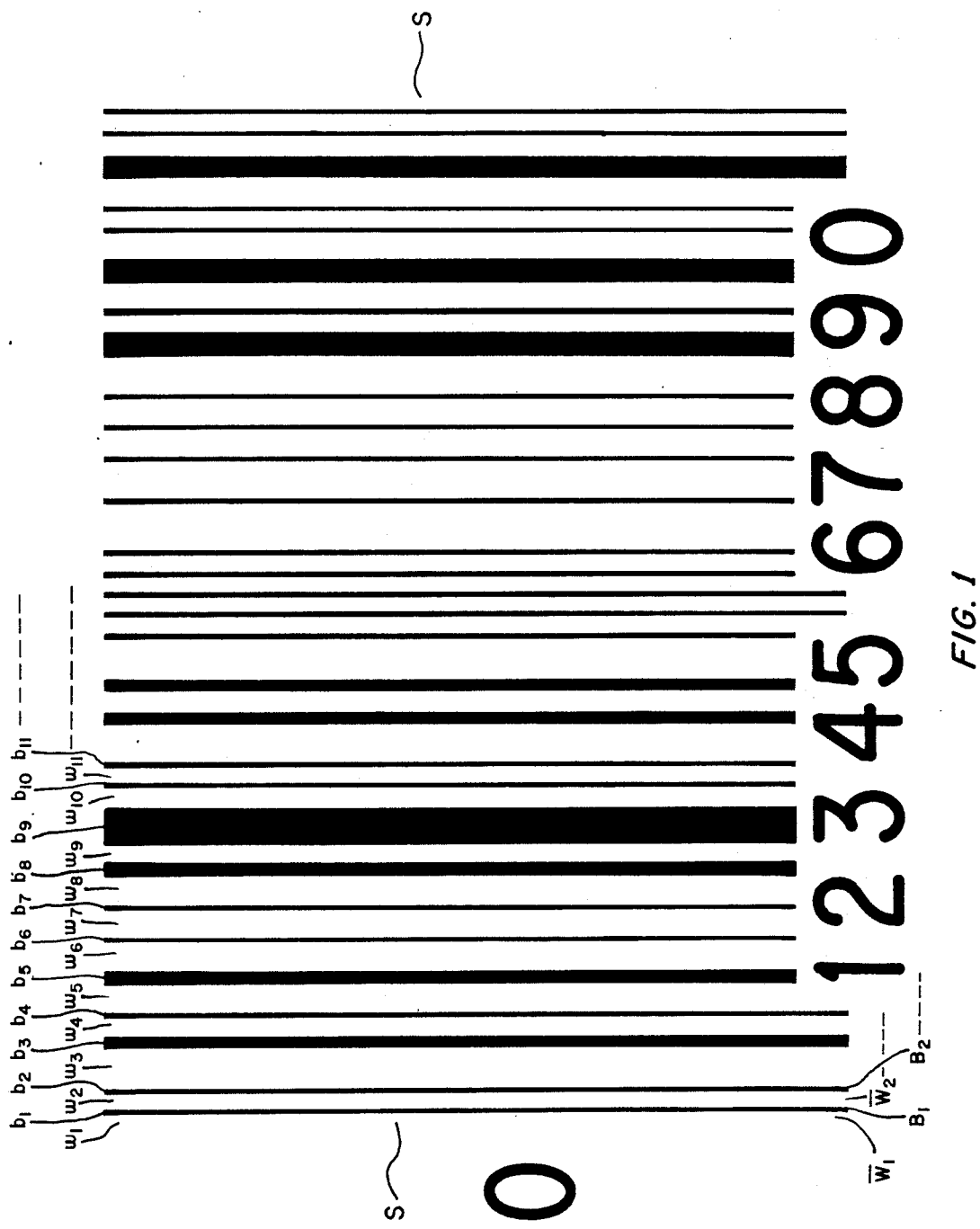
FIG. 1 shows an example of a bar code which is to be discriminated by the present invention.

DESCRIPTION OF THE PREFERRED EMBODIMENT OF THE PRESENT INVENTION:

FIG. 1 shows an example of a bar code which is to be discriminated by the present invention. A symbol $W_1$ identifies a space, and the symbols $B_1$, $W_2$ and $B_2$ identify guard bars. Further, symbols $W_3$, $B_3$, $W_4$ and $B_4$ correspond to the first character, i.e., a number system character and symbols $W_5$, $B_5$, $W_6$ and $B_6$ correspond to the second character, i.e., a numeral "1". Similarly, symbols $W_7$, $B_7$, $W_8$ and $B_8$ correspond to the third character, i.e., a numeral "2", symbols $W_9$, $B_9$, $W_{10}$ and $B_{10}$ correspond to the fourth character, i.e., a numeral "3", and so on. The bar code shown in FIG. 1 is standardized as the Universal Product Code (UPC).

Figure 2:
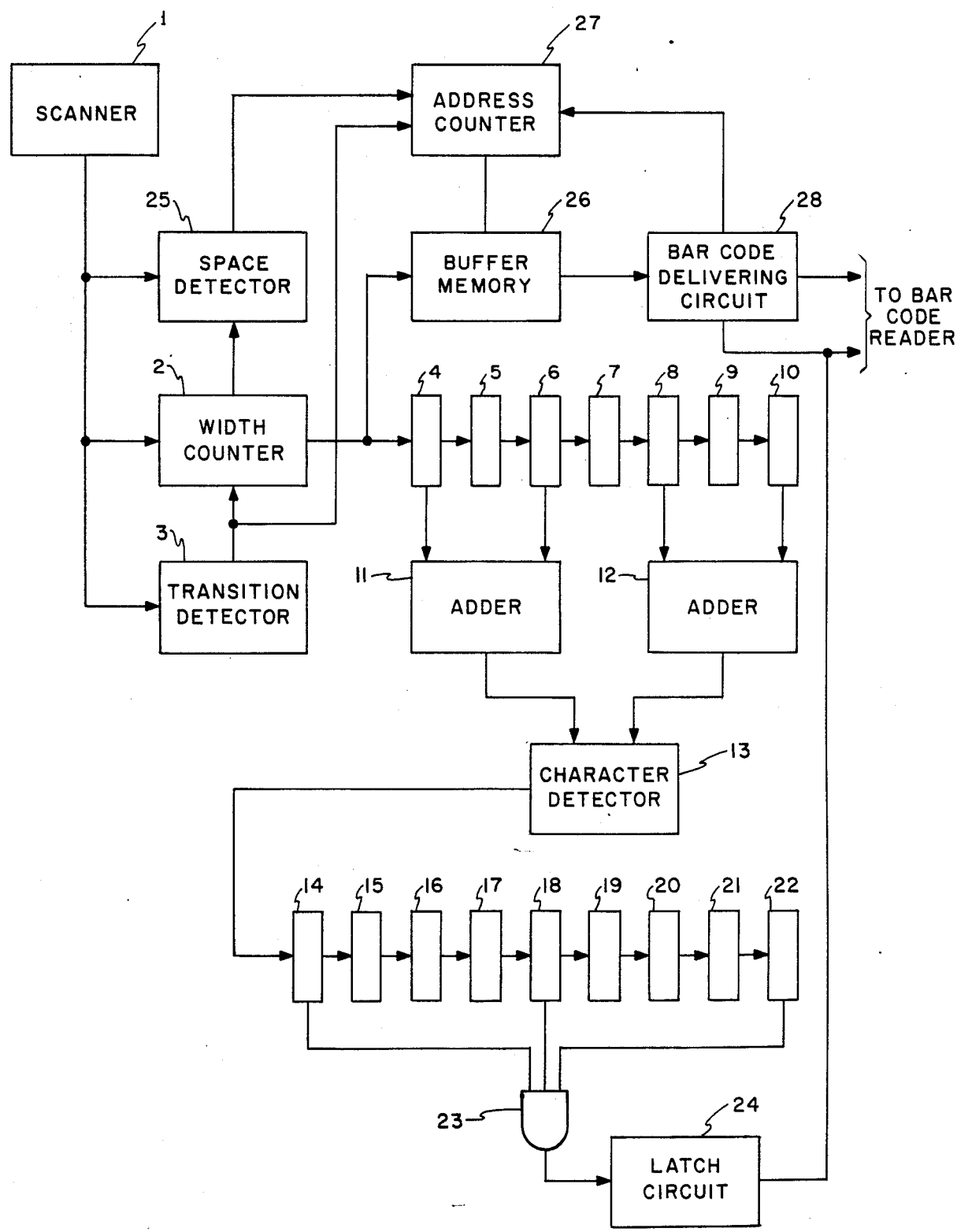
FIG. 2 is a block diagram of an embodiment of the present invention.

FIG. 2 shows an embodiment of the present invention. The bar code shown in FIG. 1 is scanned by a scanner 1 which delivers an electrical pulse signal containing a high level pulse width corresponding to a space area and a white bar and a low level pulse width corresponding to a black bar. In the bar code of FIG. 1, a width corresponding to one character, which includes two white bars and two black bars, is used as a constant. The electrical pulse signal delivered from the scanner 1 is supplied to a width counter 2 and a transition detector 3. The transition detector 3 detects a transition timing from the high level pulse to the low level pulse or vice versa. The width counter 2 delivers data corresponding to an added width of adjacent white and black bars under the control of the transition timing which is delivered from the transition detector 3. For example, the width counter 2 sequentially delivers a plurality of data corresponding to sums $(w_1+b_1)$, $(b_1+w_2)$, $(w_2+b_2)$, $(b_2+w_3)$, $(w_3+b_3)$, .... The sum of the white bar width and the black bar width is hereinafter represented as a white-black data $(w+b)$, and that of the black bar width and the white bar width as a black-white data $(b+w)$.

The white-black data and the black-white data sequentially delivered from the width counter 2 are stored in a buffer memory 26 and are sequentially shifted in shift registers 4 to 10. The data shifting in the shift registers 4 to 10 are controlled in accordance with the transition timing. Therefore, the white-black data and the black-white data are stored alternately and are shifted in the shift register 4 to 10. The two data delivered from the shift register 4 and the shift register 6 are supplied to an adder 11, while the two data delivered from the shift register 8 and the shift register 10 are applied to an adder 12. Two added data from the adder 11 and 12 are supplied to a character detection circuit 13. The character detection circuit 13 delivers a character detection signal of "1" when the two added data delivered from the adder 11 and 12 are substantially equal with each other, i.e., a difference between the two added data is within a predetermined value, which is predetermined in consideration of a printing quality of the bar code.

However, in practice, the character detection circuit 13 frequently delivers the character detection signal, when the scanner 1 scans the area surrounding the bar code. Therefore, the character detection signal delivered from the character detection circuit 13 is not used as a character discriminating signal.

According to the present invention, the character detection signal delivered from the character detection circuit 13 is further transmitted to shift registers 14 to 22 for preventing an error bar code discrimination. The shift registers 14 to 22 are operated synchronously with the shift registers 4 to 10. In the Universal Product Code (bar code), the number of characters contained in the bar code is varied in accordance with a user's specification. However, at least four characters are usually contained in the bar code. Therefore, four consecutive character detections are checked for discriminating the bar code in the present invention. Accordingly, the picked up signals are shifted into the registers 14, 18 and 22 and then are supplied to an AND gate 23 for checking four consecutive character detections.

FIG. 3 shows a data shifting table which will be used to give a detailed explanation of the invention. At a shift order "11" (left-hand column), the adder 11 (FIG. 2) delivers the data $(b_6+w_6+b_5+w_5)$ representing the character width of the numeral "1" and the adder 12 delivers the data $(b_4+w_4+b_3+w_3)$ representing the character width of the number system character. Since the character width is designed to be constant, the character detection circuit 13 delivers the character detection signal "1". At a shift order 15, the adder 11 delivers the data $(b_8+w_8+b_3+w_7)$ of the numeral "2" and the adder 12 delivers the data $(b_6+w_6+b_5+w_5)$ of the numeral "1". In this case, another character detection signal "1" is delivered. Furthermore, at a shift order 19, a further character detection signal "1" is delivered, similarly, and the AND gate 23 delivers the bar code discriminating signal. At this timing, the bar code discriminating signal indicates the existence of four consecutive characters since each character detection signal "1" shows the existence of two adjacent characters. The bar code discriminating signal delivered from the AND gate 23 is applied through a latch circuit 24 to a bar code reader and a bar code data delivering circuit 28.

On the other hand, the data delivered from the width counter 2 is supplied to a space detection circuit 25, which detects spaces S on the both sides of the bar code shown in FIG. 1, when the data from the counter 2 exceeds a predetermined value which is greater than the maximum value for the white or black bar. The output of the space detection circuit 25 is supplied to a memory address counter 27, which is supplied with the transition timing from the detector 3. The buffer memory 26 stores the white-black data and the black-white data delivered from the width counter 2 under the control of address data from the memory address counter 27.

In detail, when the space detection circuit 25 detects the space S of the surrounding area on the left side of the bar code, the buffer memory 26 begins to store the width data. Then, when the space S on the right side of the bar code is detected after the bar code is read and the discriminating signal has been deliverd, the width data stored in the buffer memory 26 is regarded as a bar code data and is transmitted through the bar code data delivering circuit 28 to the bar code reader. On the contrary, when the space S is detected secondarily but the bar code discriminating signal is not delivered, the buffer memory 26 begins to restore the width data delivered from the width counter 2, i.e., the data previously stored in the memory 26 disappears according to restoring.

As described above, the present invention relates to, not only the detecting condition in which the widths of adjacent characters are substantially the same, but also to the discriminating condition in which at least four consecutive characters should be included in a bar code. Consequently, the inventive bar code discriminating apparatus accurately discriminate a bar code even when the surrounding area of the bar code contains patterns such as numerals, alphabets, etc. other than the bar code. According to the present invention, it is easy to extract only a signal which accurately corresponds to a bar code. The signal is extracted from a scanned signal delivered from an optical scanner. A bar code reader can be constructed by a simple circuit configuration and a low calculation speed processor.

Those who are skilled in the art will readily perceive how to modify the invention. Therefore, the appended claims are to be construed to cover all equivalent structures which fall within the true scope and spirit of the invention.

What is claimed is:

1. A bar code discriminating apparatus for reading bar codes, said apparatus comprising:
    means responsive to scanning a surface containing a bar code for delivering a scanned signal, said bar code including a plurality of characters each having a uniform width, each of said characters being constituted by a plurality of sets of white and black bars;
    means responsive to said scanned signal delivered from said scanning means for successively measuring widths corresponding to a white bar and a black bar adjacent thereto and widths corresponding to a black bar and a white bar adjacent thereto to alternately deliver width data corresponding to said adjacent white and black bars and to said adjacent black and white bars;
    first shift register means for shifting said width data delivered from said measuring means;
    means for adding a plurality of said width data shifted by said first shift register means to deliver character width data for said character;
    means for comparing said character width data for a plurality of characters to deliver a character detection signal when said character width data are substantially equal to each other;
    second shift register means for shifting said character detection signal delivered from said comparing means; and
    means responsive to the outputs of said second shift register means for checking the sequence of said character detection signals to deliver a bar code discriminating signal.

2. A bar code discriminating apparatus as claimed in claim 1, further comprising:
    means for detecting spaces on both sides of said bar code in said scanned signal;
    means for storing width data corresponding to white bars and black bars in response to the output of said measuring means; and
    means responsive to the output of said space detecting means and said bar code discriminating signal for reading said width data stored in said storing means to supply it to a bar code reader.

3. A bar code discriminating apparatus for bar code reading comprising:
    means for scanning a surface containing a bar code to deliver a scanned signal, said bar code including a plurality of characters each having a uniform width;
    means responsive to said scanned signal delivered from said scanning means for detecting the existance of said characters included in said bar code by comparing widths for adjacent characters; and
    means responsive to the output of said detecting means for checking the sequence of the outputs of said character detecting means to deliver a bar code discriminating signal.

4. A reader for a bar code of spaced parallel bars of different widths having uniform character widths, said reader comprising means for scanning a bar code within a surrounding area which area may deliver noise signals when scanned, means responsive to said scanner means for detecting the widths of adjacent spaces and bars, means responsive to said detector means for adding at least two data relating to said detected widths, means responsive to said adding means for comparing said added data and for delivering a bar code discriminating signal when said uniform width is detected, means for detecting the space of said surrounding area, and means responsive to said space detecting means for reading out said discriminated bar code signal.

5. The reader of claim 4 and first multi-stage shift register means driven responsive to said width detecting means, means for adding the outputs of predetermined ones of said first shift register stages to deliver width data for the spaces and bars read by said scanning means, and means responsive to the adding means for reading the data stored in said shift register.

6. The reader of claim 5 and second multi-stage shift register means for checking the sequence of character detection signals to verify a bar code signal.

7. A bar code reading apparatus for a bar code including a plurality of white and black bars, at least four characters being contained therein, each character consisting of two sets of white and black bars, the total width of four bars forming each character being the same, said apparatus comprising:

means for scanning a surface containing said bar code to produce a scanned signal;

means responsive to said scanned signal for successively measuring a first width in total of a white bar and a next black bar adjacent thereto and a second width in total of a black bar and a next white bar adjacent thereto to alternately produce first width data and second width data;

first shifting means for alternately shifting said first width data and said second width data;

means coupled to said first shifting means for adding two adjacent first width data or two adjacent second width data to produce two character width data, said two character width data corresponding to two adjacent characters;

means for comparing said two character width data to produce a character distinction signal, said character distinction signal having a predetermined binary state when said two character width data are substantially equal to each other;

second shifting means for shifting said character distinction signal; and means coupled to said second shifting means for checking the sequence of said predetermined binary state contained in said character distinction signal to produce a bar code discriminating signal.

* * * * *